United States Patent
Scallie (10) Patent No.: US 7,628,702 B2
(45) Date of Patent: Dec. 8, 2009

(54) MISSION CONTROL SYSTEM FOR GAME PLAYING SATELLITES ON NETWORK

(75) Inventor: Laurent Scallie, San Francisco, CA (US)

(73) Assignee: Atlantis Cyberspace, Inc., Honolulu, HI (US)

( * ) Notice: Subject to any disclaimer, the term of this patent is extended or adjusted under 35 U.S.C. 154(b) by 880 days.

(21) Appl. No.: 10/011,023

(22) Filed: Nov. 2, 2001

(65) Prior Publication Data

US 2002/0082086 A1    Jun. 27, 2002

Related U.S. Application Data

(60) Provisional application No. 60/244,796, filed on Nov. 2, 2000.

(51) Int. Cl.
  *A63F 9/24*    (2006.01)
(52) U.S. Cl. ............................. 463/42; 700/90; 700/91; 705/14
(58) Field of Classification Search .................. 463/42; 700/90–91; 705/14
  See application file for complete search history.

(56) References Cited

U.S. PATENT DOCUMENTS

| | | | | | |
|---|---|---|---|---|---|
| 4,283,709 A | * | 8/1981 | Lucero et al. | ................. | 463/25 |
| 4,335,809 A | * | 6/1982 | Wain | ............................ | 463/20 |
| 4,494,197 A | * | 1/1985 | Troy et al. | ..................... | 463/18 |
| 4,572,509 A | * | 2/1986 | Sitrick | .......................... | 463/31 |
| 4,636,951 A | * | 1/1987 | Harlick | ......................... | 463/25 |
| 4,805,907 A | * | 2/1989 | Hagiwara | ...................... | 463/26 |
| 4,964,638 A | * | 10/1990 | Ishida | .......................... | 463/27 |
| 4,998,199 A | * | 3/1991 | Tashiro et al. | ................. | 463/29 |
| 5,043,887 A | * | 8/1991 | Richardson | .................. | 463/19 |
| 5,114,155 A | * | 5/1992 | Tillery et al. | ................. | 273/371 |
| 5,159,549 A | * | 10/1992 | Hallman et al. | ............... | 463/26 |
| 5,249,800 A | * | 10/1993 | Hilgendorf et al. | ............ | 463/27 |
| 5,359,510 A | * | 10/1994 | Sabaliauskas | ................. | 700/91 |
| 5,428,528 A | * | 6/1995 | Takenouchi et al. | ........... | 463/42 |
| 5,586,257 A | * | 12/1996 | Perlman | ........................ | 463/42 |
| 5,695,400 A | * | 12/1997 | Fennell et al. | ................. | 463/42 |
| 5,702,305 A | * | 12/1997 | Norman et al. | ................ | 463/42 |
| 5,796,373 A | | 8/1998 | Ming-Yen | | |
| 5,855,516 A | * | 1/1999 | Eiba | ............................. | 463/42 |
| 5,930,765 A | * | 7/1999 | Martin | ......................... | 705/14 |
| 5,971,855 A | * | 10/1999 | Ng | ............................... | 463/42 |
| 5,984,786 A | * | 11/1999 | Ehrman | ........................ | 463/42 |
| 6,042,476 A | * | 3/2000 | Ohashi et al. | ................. | 463/40 |

(Continued)

Primary Examiner—James S McClellan
(74) Attorney, Agent, or Firm—Rosenfeld Law Corp.; Mitchell S. Rosenfeld (57) ABSTRACT

A "mission control" (administration) system for controlling multiple game playing satellite computers on a network employs a mission control program that sends generic control commands to the satellite computers for controlling game programs to be played on the satellite computers. In response to a generic command to start a game program, the satellite computer's game control program loads a game-specific command set from its database for controlling the selected game program, and provides the mission control program with status information on the game program. The game-specific command sets are derived by analyzing each game program and determining standard game control codes. The game status information is derived by parsing game log files and identifying keywords. A plurality of mission control sites can be connected via Internet to a network server which provides an online interface to players anywhere.

10 Claims, 3 Drawing Sheets

U.S. PATENT DOCUMENTS

| | | |
|---|---|---|
| 6,099,408 A | 8/2000 | Schneier |
| 6,165,068 A * | 12/2000 | Sonoda et al. ............ 463/8 |
| 6,295,068 B1 | 9/2001 | Peddada |
| 6,409,602 B1 * | 6/2002 | Wiltshire et al. ............ 463/42 |
| 6,431,983 B2 * | 8/2002 | Acres ............ 463/25 |
| 6,645,077 B2 * | 11/2003 | Rowe ............ 463/42 |

* cited by examiner

MISSION CONTROL SYSTEM FOR GAME PLAYING SATELLITES ON NETWORK

This U.S. patent application claims the priority benefit of U.S. Provisional Application No. 60/244,796 filed on Nov. 2, 2000, entitled "Mission Control for Multi-Player Games On The Internet", by inventors in common with the present application.

TECHNICAL FIELD

This invention generally relates to a mission control (administration) system for controlling multiple game playing satellite computers on a network.

BACKGROUND OF INVENTION

Video games and 3D virtual reality games are commonly played at stand-alone game stations in game arcades. A player typically chooses whatever game he/she wants to play and queues up at or is assigned a stand-alone game station which is loaded with the selected game. Some arcade systems have a computerized station for handling some common administrative functions such as player sign-in, maintaining player accounts, or logging game dates or selections. However, they do not utilize centralized control to keep track of and monitor plays at multiple game stations unless all the games are written in the same proprietary format used by the producer of the arcade system. If a multi-player network game is offered, the game stations are loaded only with the same game and exchange data for only that game via a local network connecting the game stations together. As a result, current arcade systems either do not offer the many popular video game titles written by other game publishers, or offer another game title on a stand-alone game station or multi-player game title on dedicated networked game stations which do not offer other game titles and are not subject to centralized control.

SUMMARY OF INVENTION

In accordance with the present invention, a mission control (administration) system for controlling multiple game playing satellite computers on a network comprises:

(a) a mission control computer which operates administrative programs for performing administrative functions for multiple game playing stations connected by the network;

(b) a plurality of game playing satellite computers provided at respective game playing stations each maintaining a plurality of game programs;

(c) a network connecting the mission control computer to the plurality of game playing satellite computers, (d) wherein said mission control computer includes a mission control program for controlling the plurality of games available to be played on the game playing satellite computers by issuing generic control commands to the game playing satellite computers, and (e) wherein each of said game playing satellite computers includes a satellite game control program for controlling each of the plurality of game programs available to be played on the satellite computer by receiving a generic control command to start a selected game program issued by said mission control computer and loading in response thereto a game-specific command set corresponding to the selected game program, and by providing said mission control computer with a status report of the status of the selected game program being played on the satellite computer.

In a preferred embodiment of the mission control system, the satellite computer control program scans game log files as games are played and extracts game status information from the log files for its status reports to the mission control computer. The mission control computer control program uses the status report information for a wide range of administrative functions. For example, the mission control computer can generate system-wide gaming reports, membership and player statistics, detailed statistics on specific games played by specific players, current status of the system, hardware, and software troubleshooting, etc.

The satellite computers each use the same control program and maintain in a database the game-specific command sets for the game programs offered on the satellite computer. The game-specific command sets are initially derived by analyzing each game offered on the system and determining the activation, control and termination logic for each game. When a generic control command is issued by the mission control computer to start a particular game, the satellite control program loads the selected game with the corresponding game-specific command set. In this manner, the mission control computer can maintain centralized control of the game playing stations while offering many different games for play.

The mission control site may be networked to another mission control site or to a plurality of mission control sites through a wide area network or the Internet. The databases of multiple mission control sites can be replicated to a master database of a network server that provides an online interface for players in any location through the Internet. The online interface allows the system to offer a wide range of related entertainment services to players anywhere, such as looking up statistics for games they or their buddies have played at any of the mission control sites, comparing their statistics to players at other sites, downloading statistics, maintaining accounts, joining groups of players, and communicating with other players.

Other objects, features, and advantages of the present invention will be explained in the following detailed description of the invention having reference to the appended drawings.

DETAILED DESCRIPTION OF INVENTION

In the following description of the invention, the principles for centralized control of multiple game playing stations are explained using the preferred example of a commercial level, multi-station game system offering many different game programs for play. Details of the system are based on a commercially available product for game arcade systems offered by the assignee of the present invention, Atlantic Cyberspace, Inc., Honolulu, Hi., which is referred to herein by its tradename designation Atlantis OS. It is to be understood that other variations and modifications may be made given the principles of the invention described herein.

Figure 1:
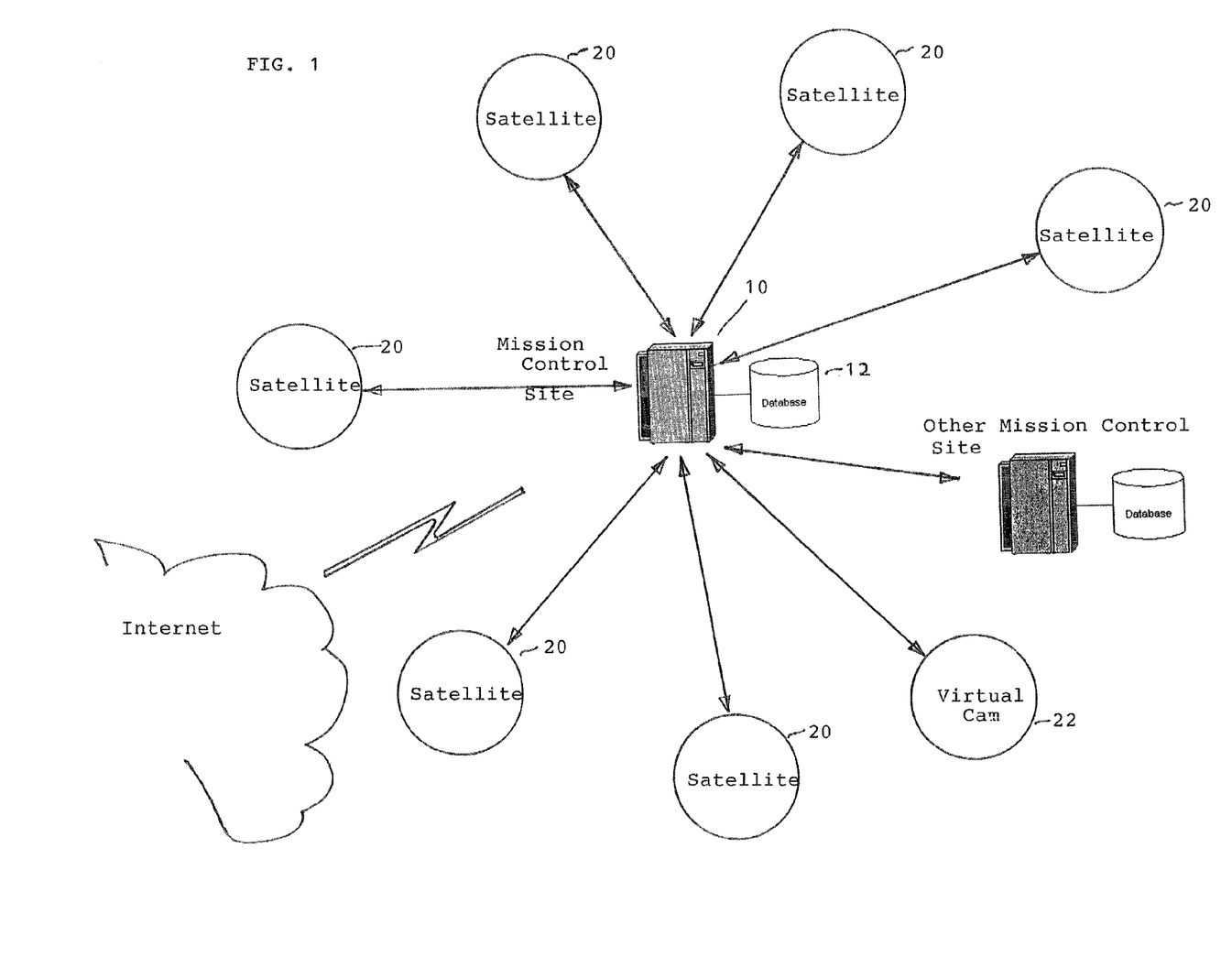
FIG. 1 is a diagram illustrating a mission control system having a mission control (administration) computer connected to multiple game playing satellite computers (stations or pods) for centralized control in accordance with the present invention.

Referring to FIG. 1, an administration or "mission control" site employs a mission control computer 10 connected by a network to multiple game playing satellite computers 20 installed at respective game playing stations or "pods". The mission control computer operates a variety of administrative programs for performing administrative functions for the game playing stations on the network. Each satellite computer operates a plurality of game programs (video games, virtual reality games, simulation games, etc.) which a player may select from. The mission control computer has a mission control program for controlling the games played on the satellite computers. The satellite computers have a satellite game control program which responds to generic control commands issued by the mission control computer to start a selected game by loading the selected game along with its game-specific command set and sending status reports to the mission control computer. The mission control computer can thus maintain centralized control of the games played on the game playing stations without having to control each of the many different games offered for play.

The Mission Control Program used by the mission control computer is the heart of the mission control system. It determines what satellite computer should be playing which games, how long the games will last, how much the player will be charged, etc. The Mission Control Program connects to each Satellite Control Program over the network to control what that satellite computer will do. The commands it issues to the Satellites can include "Start new network game", "Debrief game", "Quit current game and start new game", etc. The Mission Control Program can also connect via a wide area network or the Internet to another mission control site or to a central network server which provides an online interface to players anywhere (described in further detail below).

The mission control computer maintains in its associated database 12 game statistics, game playing data, and other information for a wide range of administrative functions. For example, the Mission Control Program can provide the operator of the system with reports, targeted marketing and promotional materials, membership details, current status of the system, hardware and software troubleshooting, etc. It can also generate and print detailed player statistics after each mission has finished as well as provide information access through the on-line interface. It can also maintain a history of all player information on the system, including: available funds on account or passcard; mailing and email addresses; current ranking among other players; etc. This information provides the system operator the ability to tailor a marketing campaign to the specific individuals based on the information stored in the database.

Figure 2:
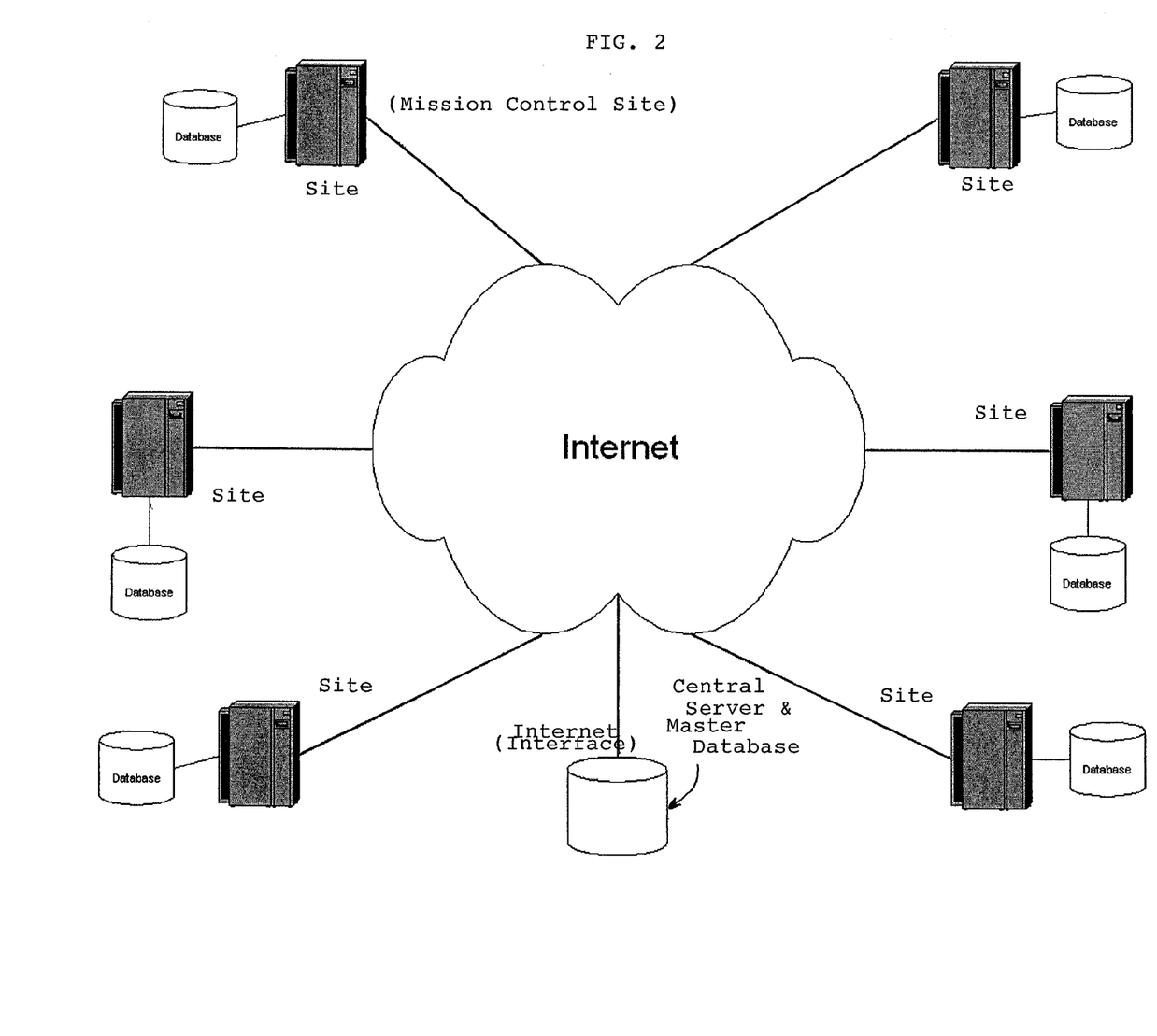
FIG. 2 is a diagram illustrating a network server connected to multiple mission control sites and providing an online interface to players anywhere through the Internet to services based on data replicated from the mission control sites.

Referring to FIG. 2, the mission control system can be extended to multiple mission control sites connected via a wide area network or the Internet. The game data from each mission control site are replicated to the central server's master database that contains all the information for all of the sites on the system. The server provides an online interface that allows players anywhere to access the game data from all (participating) sites remotely. For example, the online interface can allow a player or players to view their current stats on the system from the Internet, including player history, player information, etc. This creates content on the Internet for a system website that supports interaction and communication among players anywhere. The players could also have the ability to download data from the games that they have played for their personal interests. The online interface can also allow players to maintain their handles (user IDs) or accounts in the system, change address information, create or join groups (teams or clans), and chat with other players. Individual site operators can customize their presence on the online interface depending on what player information they choose to share with the entire online community.

The Mission Control program has the ability to control multiple Satellites running different games at the same time. In conventional systems, only a particular game can be played on a stand-alone station, or the same game must be played on all designated stations offering a particular network game. In the invention by contrast, each Satellite can offer many different games, and its Control Program will load the game-specific command set from its database required for a selected one of the many games. In this manner, Mission Control can issue a generic control command to the Satellite, e.g., to "Start (particular) game", and the Satellite then loads the game-specific command set that will enable control of that game.

An example of some of the functions performed in starting and ending a game and the commands issued by Mission Control and responses of the Satellite in the Atlantis OS system offered by Atlantis Cyberspace, Inc., is shown on Table I.

To report the current status of a game, the Satellite game control program can read the log files, the current dialog boxes or windows opened by the application (game program) running on the system, messages from the Notification API, or some other method used by the game program for external communications. For games that maintain log files, the log files can be parsed for information, e.g., whether the game is still running, when a player dies, when a player kills someone, when the game is over, when the game started, etc. By gathering this information, a status report on the game can be provided by the Satellite to Mission Control.

An example of a typical log file for the popular game "Quake" is shown in Table II. The log file is parsed for keywords identified by the system as providing status information, such as "version", "I am (player)", "playing demo", "exited (level)", "game over", etc. In Table III, examples of conversion of messages parsed from the log files into reports issued by the Satellite to Mission Control are illustrated.

The Mission Control program applies generic logic to communicate to the Satellites, however there is some minor logic based on the different types of games to control it better. For example "Quake" and "Unreal Tournament" behave slightly differently on the game server. Therefore, there is some special logic for games like "Quake" that provide full logging functionality on their servers as compared to "Unreal Tournament" which provides no logging on the server, but is provided via a "virtual cam" recorder.

In the preferred implementation, Mission Control is only notified by the Satellite when there are changes to the system state. For example, if the game were to finish then the Satellite would send Mission Control the command GAME_OVER. To prevent the assumption that a machine is working, Mission Control also expects a GAME_READY command from the Satellite every 10 seconds or so with a parameter that it is ready or not. This feature is mainly used for situations that are beyond the control of the Satellite or Mission Control where the machine locks up or the operator exits the program unexpectedly.

The Notification API are tools that allow Mission Control to determine the current status of a game program without doing any detailed research on the program itself. This is achieved by giving the game developer or program developer a set of APIs that they call in their application to notify of the current status of the program. For example, these commands can include "Game started", "Game over", "Program started", "Player joined", "Player killed", etc. The Notification API are stored as a set of DLLs available for each operating system supported by Mission Control.

Similarly, the Control API allows Mission Control, and more specifically, the Satellite the ability to control a current game or program without knowing any detailed information about the program itself. This is achieved by providing the game developer or program developer a set of APIs that they use to issue commands that "hook into" a particular game, e.g., "Start a new game", "End current game", "Join network game", etc.

To port an existing game into Mission Control without having used the Notification API or the Control API, the game or program must be analyzed for details of the logic sequences needed to control the program, e.g., how to start and stop the game, how to tell if the program is still running, how to start the program, how to start a game server, how to join a game server, etc.

Popular games offered by different game publishers often employ different command structures and use different command protocols to start, stop, and control games. In the invention system, the command architecture for each game offered by the system is analyzed and the appropriate game control signals matched to the activation, termination, and control logic for each game are stored in the Satellite database. For example, the game control signals may be stored in a relational database indexed to each particular game. When a command is issued by Mission Control to start a particular game, the relational database retrieves the set of all command signals used by that specific game and loads it with the Satellite operating system so that activation by the player of the hardware buttons and other controls results in the correct signals being delivered to the game.

As a specific example, to control a PC-based game like "Quake", distributed by Activision, Inc., Santa Monica, Calif., the computer system must send keyboard commands to the game window using the SendMessage and PostMessage commands of the Microsoft Windows™ operating system API functions. However, a network game like "Unreal Tournament" uses http commands for the game server, but requires Keybd_Event commands for the client station to control the game. Thus, the correct signals required for each of the game programs must be determined based upon the game's command architecture, e.g., keystrokes, http commands, TCP/IP commands, writing files, its control API, or via serial communications if there is a modem or a COM port on the computer. The Satellite Control Program can then interpret inputs from the player on the hardware console or network game commands sent from other stations via the network through an http interface into the correct signals required by the game to control its actions.

An example of typical commands for games maintained in a Command database is illustrated in Table IV. To let the "Unreal Tournament" game know that the player wants to shoot a weapon in the game when the player presses a trigger on the hardware console, the computer system must have the game-specific command set loaded so that a lookup of "Fire" in the command set results in the corresponding Keybd_Event of the <CTRL> signal being sent to the game. Similarly, the input "Move Forward" for this and other games will result in the <UP ARROW> keyboard signal being sent, etc.

Figure 3:
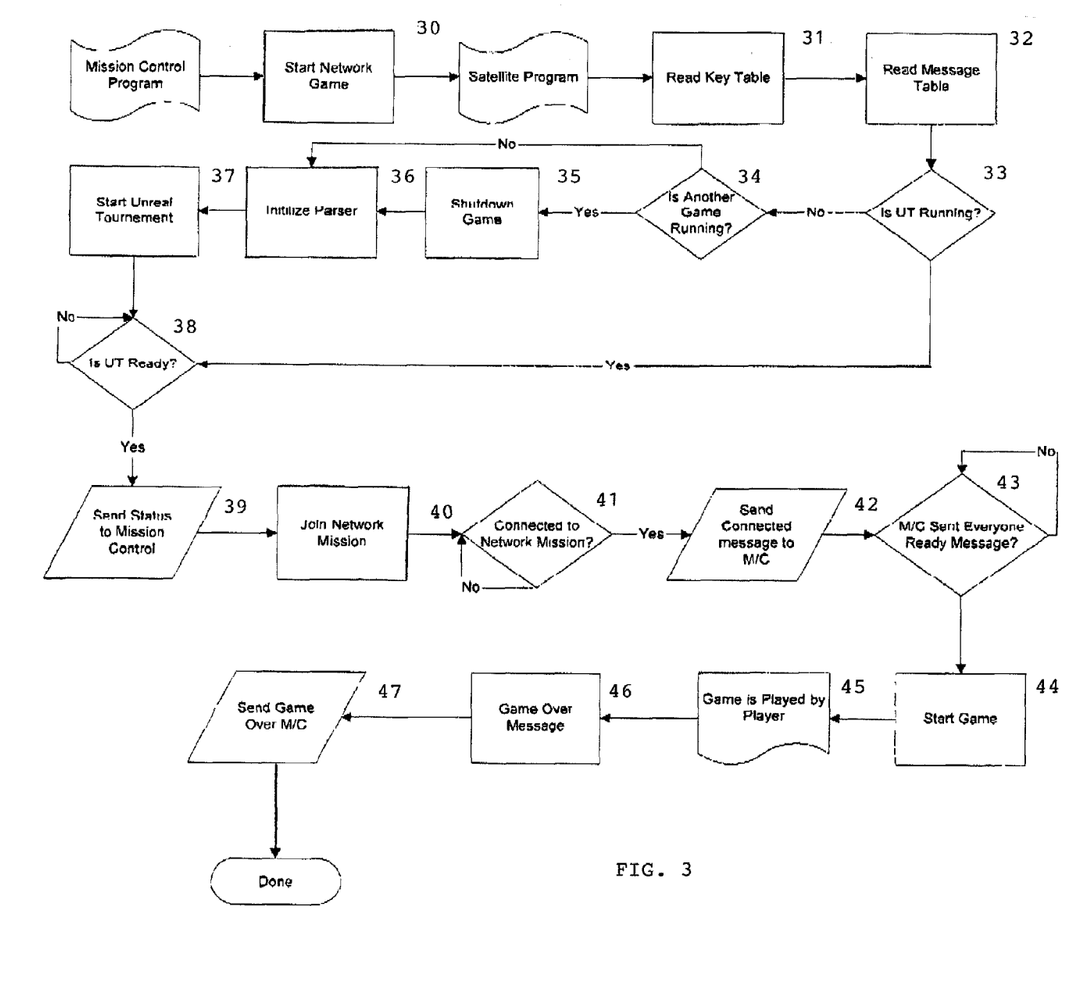
FIG. 3 is a flow chart illustrating the sequence by which the control program at a satellite computer responds to a generic control command from the mission control program to load and operate any one of a plurality of game programs offered on the system.

In FIG. 3, a typical "Start game" sequence by which the Satellite Control Program interacts with the Mission Control Program is illustrated. At block 30, Mission Control sends a generic "Start Network Game" (Unreal Tournament) command to the Satellite Control Program. The Satellite Program reads from its database the corresponding Key Table at block 31, and Message Table for parsing the games log files at block 32. At decision 33, it tests whether Unreal Tournament is already running, or at decision 34 whether another game is running. If another game is running it is shut down at block 35, then the parser for Unreal Tournament is initialized at block 36, and the Unreal Tournament game is launched at block 37. Once the game is ready (decision 38), the "Ready" status is reported to Mission Control at block 39. When a command is received from Mission Control to "Join network mission" at block 40, the Satellite Control Program checks whether its system is connected to the Network Mission (communicating with the other Satellites having players participating in the same mission) at decision 41, then sends a "Connected" message to Mission Control at block 42. It then checks whether Mission Control has sent the "Everyone Ready" message at decision 43, then starts the game at block 44. The game is then played by the player on the Satellite, in conjunction with other the other participating players on other Satellites, at block 45. All signals exchanged between networked players are handled at the game application level. When the "Game Over" message is parsed from the game's log files, at block 46, the Satellite then sends a "Game Over" message to Mission Control, at block 47.

Through the use of generic control commands to the multiple Satellites running many different games at different times, the Mission Control system provides a universal intermediary between the game programs and the hardware interface. Mission Control maintains data on the games played on the system by tracking the status reports of the Satellites. It can also handle other desired management functions, such as cash dispenser, briefing/training, monitoring game hardware, mission control, back-end information management, member management, Internet connectivity for remote management, automated updates, and player interactions. The Mission Control system allows the site operator multi-faceted control and interactivity with participants, thus enhancing player experiences and the value delivered.

The Mission Control system leverages a database-driven client-server architecture. Each client is fully controlling the activity of all applications and activity on the client computer and reporting to Mission Control, the central server that coordinates and monitors every single event in the system. The server provides a comprehensive graphical user interface for monitoring full system activity and for modifying or creating individualized missions based on a variety of player-desired parameters. By developing the entire controlling software around a high-end database engine (e.g., Sybase), the Mission Control system gains the benefit of storing all information and events into a scalable database engine, the capacity of replication for backup, remote management, site link-up and on-line interface capabilities.

For purposes or playback or debriefing the players, the Mission Control system can also record the experiences of network game players by running a satellite client of the game as an "observer". The "observer" can enter the game space along with the other players and see (record) the game action. The recording can be done from different camera angles or points of view. In FIG. 1, this "observer" is referenced as Virtual Cam 22. The Virtual Cam is programmed to execute a sequence of views or to record specific actions in the game when certain conditions are detected.

The Mission Control system can be combined with 3D display programs and drivers to convert the game programs into a complete Virtual Reality experience. As described in commonly-owned U.S. patent application Ser. No. 10/011, 027, filed on the same date, entitled "Virtual Reality Game System Using Pseudo 3D Display Driver", (incorporated herein by reference) popular PC games using Glide, OpenGL, and DirectX APIs can be converted for 3D stereoscopic displays for an immersive VR experience.

The Mission Control system can be combined with other technologies in a totally integrated game entertainment system. The integrated system can include other 3D and VR enhancement tools like the use of player and spectator videocams to record different viewpoints using 3D space analysis, artificial intelligence methods, and a library of pre-defined camera angles and motions to generate high-quality Hollywood-style coverage of action within a virtual world.

The entire VR system can be controlled and monitored by a user friendly GUI. All user and system activity can be simply monitored. All software components can be protected via a variety of security methods including preventing decompilation of code, encryption of network packets, etc.

The online interface on the Internet provided by linking mission control sites to a network server and master database allows players to engage in enhanced services and the ability to communicate with each other and play network games. Two or more Mission Controls can combine game controls and player input and output into a format that can be streamed over the network or Internet for playback on any other system. Through the online interface, players can remotely view and download their stats, their buddies' stats, clan stats, find out who the competition is, vote for best player, change handles, email or street addresses, choose player skins or faces for games that they wish to play, etc.

The accumulation of player information at each Mission Control site will allow an operator or groups of operators to organize and automate the management and marketing to players for any entertainment site of chain of sites. For example, repeat business can be automatically targeted with email messages to existing members, or to new members introduced by existing members, competitions and special events can be organized for players via email, and past members can be automatically contacted for return visits. Using briefing and de-briefing tools, the system can store player information on selection of games, teams, choice of bots, weapons, etc. A statistics engine can analyze and print players stats as well as store them for the on-line interface. This provides the player with a detailed account of their game.

Video conferencing capability can be provided between mission control sites to allow players to join a game at another site and to have a briefing and debriefing with other players to exchange tips and strategies, etc. When the game is over, they will be able to talk and see each other during the playback of the debriefing The Mission Control system can also provide players' "team leaders" with access to a mini version of the Mission Control to allow them to view the progress of games from different camera angles and help with strategy development and execution. This will also increase spectator interest as they can gain insight into the leaders' methods and approaches, similar to being able to hear a coach discuss strategy while watching the game on television. A similar mini version of the Mission Control can be provided for "directors" to mimic the control center for a televised sports event where the director has access to many cameras and directs which angles the cameras focus on and decides which ones to utilize.

Thus, the Mission Control system can greatly facilitate social interaction among players and teams and excitement over the games. All the above-mentioned features can combine to provide the best possible entertainment experience from the stand point of technology, game play, social interaction, competitive aspect, spectator sports, length of the experience versus cost and ultimately lead to high repeat business and a viable financial model.

It is understood that many modifications and variations may be devised given the above description of the principles of the invention. It is intended that all such modifications and variations be considered as within the spirit and scope of this invention, as defined in the following claims.

TABLE I

| Example function to perform | Command to Send to Satellite or Mission Control | Parameters to send to Satellite or Mission Control |
| --- | --- | --- |
| Atlantis OS Mission Control tells the Atlantis OS Satellite to start Unreal Tournament | LOAD_GAME | None |
| The Atlantis OS Satellite determines if Unreal Tournament is currently running or if another program is running. If another program is running it will shut that down based on its knowledge of that system and then start Unreal Tournament. | QUIT_GAME[1] | None |
| The Atlantis OS Satellite notifies Atlantis OS Mission Control that is starting Unreal Tournament | GAME_STARTED | None |
| When Unreal Tournament starts the Atlantis OS Satellite then notifies Atlantis OS Mission Control that Unreal Tournament is up and running. | GAME_READY | |
| Atlantis OS Mission Control now tells the Atlantis OS Satellite to join a network game that has been created on another system on another Atlantis OS Satellite. | NETWORK_GAME | Game #, World, Mode, Map, Host Name, Host IP, Player Handle, Skill, Blue Red & Bots |
| With the system has joined the game the Atlantis OS Satellite sends the message to Atlantis OS Mission Control informing it that it has joined the game. | PLAYER_CONNECTED | |
| During the game as a player completes an objective, kills someone, or gets killed themselves the Atlantis OS Satellite records the information and displays it on the LED while providing feedback to the user by the gun or vest. | Information is only sent to an LED if attached to the system | Text to send ie: "Player Name" is in the lead |
| When their allotted mission time ends Atlantis OS Mission Control tells the Atlantis OS Satellite to quit playing the current game. | PLAY_DEMO | |
| The Atlantis OS Satellite notifies the player that the game is over and please remove their headset and to open the pod rails in the case of a pod based game. | Audio commands are sent over the players headphones | |
| The Atlantis OS Satellite notifies Atlantis OS Mission Control that it has received the message and that the game is now over. | GAME_OVER | |

TABLE I-continued

| Example function to perform | Command to Send to Satellite or Mission Control | Parameters to send to Satellite or Mission Control |
|---|---|---|
| If for some reason the game were to end prematurely it would also notified Atlantis OS Mission Control that fact. | | |
| Atlantis OS Mission Control would then communicate with the debriefing station to allow it to play the game and a similar fashion as this example. | DEBRIEF_GAME | Game Number |

TABLE II

Console initialized.
Winsock TCP/IP Initialized
WIPX__Init: Unable to open control socket
Exe: 09:30:49 Mar 21 1997
16.0 megabyte heap
Sound Initialization
637k surface cache
320×240
CD Audio Initialized
joystick not found -- no valid joysticks (a5)
execing quake.rc
execing default.cfg
Unknown command "volume"
execing config.cfg
execing autoexec.cfg
8 demo(s) in loop
Playing demo from dontdel.dem.
ERROR: couldn't open.
execing server.cfg
"skill" is "1"
3 demo(s) in loop
VERSION 1.09 SERVER (21066 CRC)
-------------------------------
Azure Agony
execing server.cfg
"skill" is "1.000000"
VERSION 1.09 SERVER (21066 CRC)
-------------------------------
Azure Agony
Guest313 entered the game
Guest312 entered the game
Debug entered the game
Camera running
I Am Player DragonMan
Guest313 killed Guest312
Guest312 killed Guest312
NET__GetMessage: disconnected socket
VERSION 1.09 SERVER (21066 CRC)
-------------------------------
Azure Agony
Camera running
Guest313 entered the game
Guest312 entered the game
Debug entered the game
Guest312 left the game with 0 frags
Guest313 left the game with 0 frags
Camera deactivated
Debug left the game with 0 frags
execing server.cfg
"skill" is "1.000000"
VERSION 1.09 SERVER (21066 CRC)
-------------------------------
Azure Agony
Guest313 entered the game
Guest312 entered the game
Debug entered the game
Camera running TABLE II-continued NET__GetMessage: disconnected socket
VERSION 1.09 SERVER (21066 CRC)
-------------------------------
Azure Agony
Camera running
Guest313 entered the game
Guest312 entered the game
Debug entered the game
Guest313 left the game with 0 frags
Camera deactivated
Guest312 left the game with 0 frags
Debug left the game with 0 frags

TABLE III

| What the Atlantis OS Satellite looks for | What Atlantis OS Satellite converts this to |
|---|---|
| VERSION | If a player is connected then this is signaling that the game has started. |
| I Am Player | Player has connected to the game |
| Playing demo | System is playing a demo and unless it is the Debriefing machine the system is Ready |
| Exited the level | The player exited the current level and therefore a new level will start. The system will start the next level up with the correct time remaining. |
| GameOver | The game is over |

TABLE IV

| Game | Command | Key to Send to Game |
|---|---|---|
| Unreal Tournament | Jump | <SPACE> |
| Unreal Tournament | Fire | <CTRL> |
| Quake | Jump | <ALT> |
| Quake 3 | Change Weapons | \ |
| All Games | Move Forward | <UP ARROW> |
| All Games | Move Backward | <DOWN ARROW> |

The invention claimed is:

1. A method of operating a mission control (administration) system for controlling multiple game playing satellite computers on a network comprising:

(a) providing a mission control computer which operates administrative programs for performing administrative functions for multiple game playing satellite computers on a network;

(b) providing a plurality of game-playing satellite computers connected to the network, each of which maintains a plurality of game programs and game-specific command sets for controlling the play of respective ones of said plurality of game programs;

(c) storing in each game-specific command set of a satellite computer at least a game-specific start signal and a game-specific stop signal for starting and stopping a respective game program, respectively, on the satellite computer;

(d) issuing a generic game start signal from the mission control computer to a satellite computer which is indexed to the game-specific start signal of the game-specific command set for a respective game program on the satellite computer in order to cause the game-specific start signal of the game-specific command set to be issued by the satellite computer for starting the game program;

(e) enabling the game program once started to be played on the satellite computer by local game-specific command inputs of a game player to the satellite computer; and whereby generic command signals can be issued by the mission control computer to control the administration of game programs played on any of the satellite computers, while enabling local game-specific command inputs to be used by a game player to control the playing of a game program on the satellite computer.

2. A method of operating a mission control system according to claim 1, further comprising generating with the playing of each game program on a satellite computer one or more of the following sources of information for tracking the operation of the game program, and parsing said source of information for desired status information and providing it to the mission control computer: game log files; dialog boxes or windows opened by the game program; messages from the Notification API; and a method used by the game program for external communications.

3. A method of operating a mission control system according to claim 1, further comprising providing each satellite computer a local control program and a database of game-specific command sets for each of the game programs offered on the satellite computer, such that when a generic game-start signal is issued by the mission control computer to the satellite computer, the local control program of the satellite computer loads the corresponding game-specific command set from its database to operate the game program.

4. A method of operating a mission control system according to claim 1, wherein each game-specific command set contains game-specific control codes derived by analyzing each game program and determining its configuration for at least a game-specific start signal for the given game program.

5. A method of operating a mission control system according to claim 2, wherein said mission control computer maintains a database of game data based upon status information provided by the satellite computers, and generates one or more administrative reports from the group consisting of: system-wide gaming reports; membership and player statistics; detailed statistics on specific games played by specific players; current status of the system, hardware, and software troubleshooting.

6. A method of operating a mission control system according to claim 1, wherein a plurality of mission control computers are maintained at respective mission control sites and are connected via a network to a network server that provides an online interface to the mission control computers for remote access by players.

7. A method of operating a mission control system according to claim 6, wherein said online interface of said network server allows players to perform one or more activities of the group consisting of: looking up statistics for game programs they have played; seeing the status of game programs being played by other players; seeing statistics for comparison to game programs played at other mission control sites; downloading statistics for their own later use; maintaining their accounts; joining or maintaining their status with a group of players; and communicating with other players.

8. A method of operating a mission control system according to claim 2, wherein each satellite computer generates a log file for tracking the operation of a game program, and parses the log file for predetermined keywords indicative of desired status information and provides the status information to the mission control computer.

9. A method of operating a mission control system according to claim 4, wherein the game-specific control codes for the game-specific command set for a game program are configured based upon one of the group of game command architecture types consisting of: keystrokes; http commands; TCP/IP commands; writing files; control APIs; and serial communications protocols.

10. A method of operating a mission control system according to claim 4, further comprising issuing a generic game stop signal from the mission control computer to the satellite computer indexed to the game-specific stop signal of the game-specific command set for the game program in order to cause the game-specific stop signal of the game-specific command set to be issued by the satellite computer for stopping the game program.

* * * * *